W. N. BOOTH.
DETACHABLE TIRE HOLDING RING.
APPLICATION FILED DEC. 19, 1911.
1,162,217.
Patented Nov. 30, 1915.
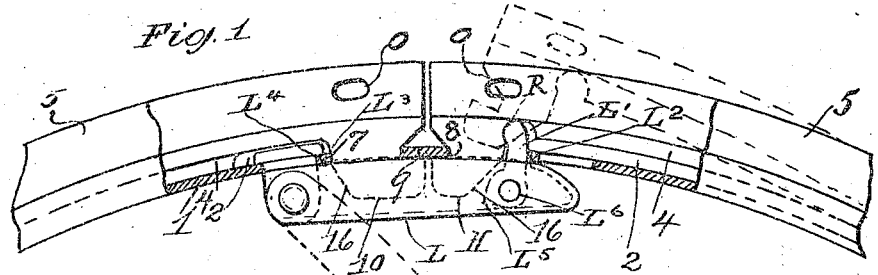
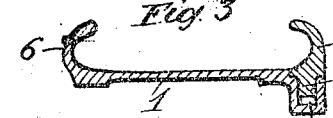
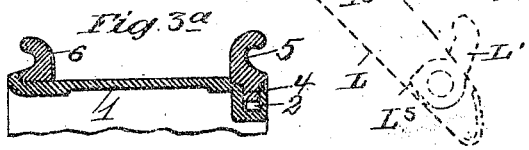
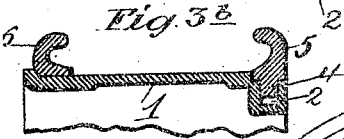
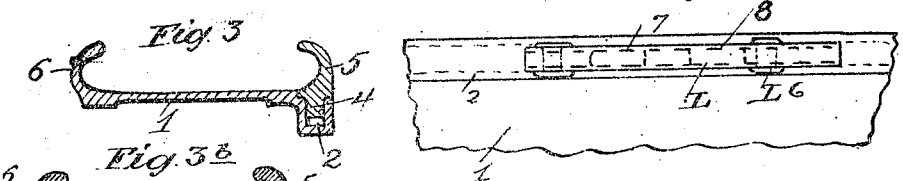
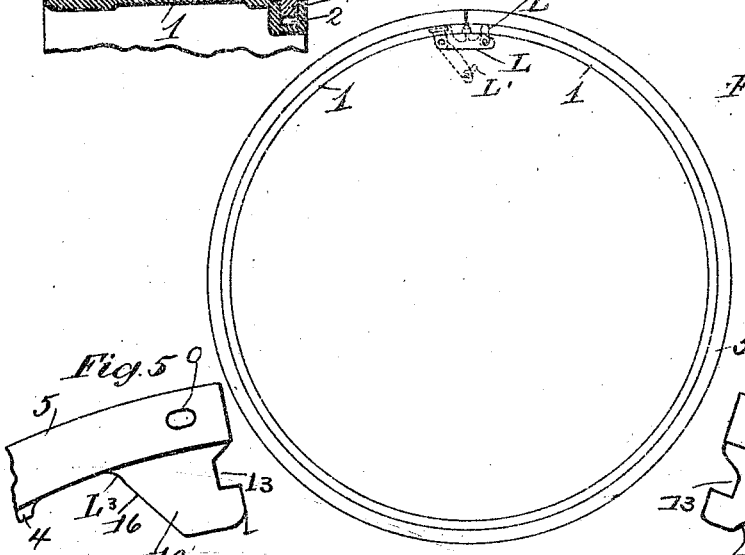
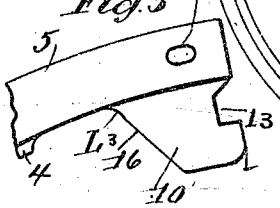
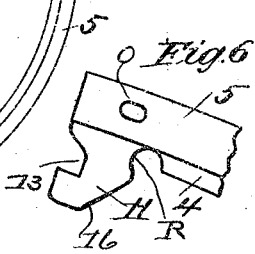
Witnesses
Inventor
William N. Booth
by Wm. M. Monroe
Attorney

UNITED STATES PATENT OFFICE.

WILLIAM N. BOOTH, OF DETROIT, MICHIGAN, ASSIGNOR TO THE BOOTH DEMOUNTABLE RIM COMPANY, OF CLEVELAND, OHIO, A CORPORATION OF OHIO.

DETACHABLE TIRE-HOLDING RING.

1,162,217.  Specification of Letters Patent.  Patented Nov. 30, 1915.

Application filed December 19, 1911. Serial No. 666,831.

*To all whom it may concern:*

Be it known that I, WILLIAM N. BOOTH, a citizen of the United States, and resident of Detroit, in the county of Wayne and State of Michigan, have invented certain new and useful Improvements in Detachable Tire-Holding Rings, of which I hereby declare the following to be a full, clear, and exact description, such as will enable others skilled in the art to which it appertains to make and use the same.

The objects of the invention are to provide a detachable tire holding split ring to be used in connection with a tire rim, and so constructed as to be simple in construction and convenient for use in locking a pneumatic tire upon the rim.

This device is an improvement upon the device described in my former applications Ser. Nos. 605,528 and 595,816, for a quick detachable ring, in this respect that a separate locking ring is dispensed with and the tire holding ring is itself split and expansible to release the tire and is provided with means for bringing the ends closely together upon the tire and for releasing the ends when it is desired to remove the tire.

The invention comprises the combination and arrangement of parts and construction of the clamping means as hereinafter described, shown in the accompanying drawings and specifically pointed out in the claims.

In the accompanying drawings Figure 1 is a longitudinal section showing the extremities of the ring in the locking position and showing the clamping device in the closed position and in dotted lines the clamping member is shown in the released position; Fig. 2 is a plan view of the clamping device from the inner side of the rim; Fig. 3 is a transverse section of the rim and spring locking ring; Fig. 3ª is a transverse section of rim showing tire holding rings arranged for a straight sided tire; Fig. 3ᵇ is a similar section showing the holding rings arranged for a clencher tire; Fig. 4 is a side elevation of the ring and Figs. 5 and 6 are detailed views in elevation of the respective ends of the ring.

In these views 1 represents the sheet metal rim for the tire, 2 represents the marginal annular slot therein in which is secured the annular flange or tongue 4 which is integral with the clamping ring 5.

Upon the outer edge of the rim is shown the flange 6 corresponding in curvature to the locking ring. Upon one side of the tire rim are narrow longitudinal slots 7 and 8 separated by the intervening integral portion 9. Each extremity of the split ring is provided with an inwardly projecting extension of the tongue or flange adapted to pass through one of the openings 7 or 8 in the rim. These extremities are designated by numerals 10 and 11 respectively and each is provided with a rectangular opening in its outer edge 13 and when closed the solid portion between the slots is inclosed by the two portions 13, 13. Each projection 10 and 11 is beveled at 16 on its inner face so as to project radially through its respective slot 7 or 8 and the thickness of the flange or tongue 3 is less than the thickness of the slot in which it lies, so that the projections at the extremities of the ring can easily be passed through these openings or removed therefrom. The extremity 11 shown at the right of Fig. 1 is of less width than the length of the slot 8 so that it can be removed from its secured position and lastly the projection 10 is removed from its locking position. To retain these parts in position the projection 11 is cut away in circular form at the angle where it joins the tongue or flange 4, and a clamping lever L pivoted on the inner face of the ring at the left of the opening 9 shown in Fig. 1, extends upon both sides of the projections 10 and 11 and is provided with pivoted pawl L' which can be forced backward between the edge of the projection 11 and the edge L² of the rim and will engage at this outer end with the recess before mentioned at the angle of junction of said projection with the flange or tongue 3 thus holding the parts rigidly in position. When the tire is inflated upon this rim the extremities of the ring will be moved apart and the pawl L' will be forced against the edge L² of the rim, and the projection 10 and a shoulder L³ upon the projection 10 which will engage forcibly with the edge L⁴ of the rim, thus preventing the parts from unlocking themselves. The pawl is provided with a shoulder at its lower end L⁵ to prevent it from falling backward into the lever which is made hollow so as to inclose the two projections 10 and 11 and prevent the entrance of dust into the openings 7 and 8. This lever is preferably formed of sheet metal folded upon itself to inclose the pawl, and the pawl is pivoted at L⁶ to the folded sides of the lever. Each extremity of the ring is provided with an opening O into which the extremities of the lever can be inserted to force the parts together again, so that the pawl can be released from its position by dropping the lever as shown in dotted lines in Fig. 1. When this has been accomplished by inserting a suitable tool underneath the end of the projection 11 it can be sprung to clear the edge of the rim, and the ring can be easily removed to replace the tire upon the rim.

Any variety of tool suitable for this purpose can be employed, which need not be described herein.

Having described the invention what I claim as new and desire to secure by Letters Patent is:

1. The combination with a tire rim having a circumferential annular slot at one edge thereof, of a split tire holding ring provided with an integral annular tongue or flange on its inner face, said rim provided with elongated radial openings and with an integral portion intermediate of said openings and the extremities of said ring provided with inwardly extending projections and slotted extremities adapted to engage said intermediate solid portion, a pivoted lever adapted to engage said projecting portions on said ring when said ring is closed and a device at one extremity of said lever insertible through one of said slotted openings, adapted to engage and retain one of said projections in the locking position.

2. The combination with a rim, of a split tire locking ring thereon, said rim provided with slotted openings and an integral portion between said openings and said ring provided with projecting portions adapted to pass through said slotted openings, a clamping device pivoted on said rim and adapted to overlap said integral portion, and means pivoted to said clamping device for detachably securing one of said ring extremities in place the extremities of said ring interlocking with said rim between said openings therein.

3. The combination with a rim provided with a circumferential marginal slot and with slotted openings in the base of said marginal slot and an integral portion separating said openings, of a split tire holding ring provided with an annular flange adapted to enter said circumferential slot in said rim, the extremities of said tire holding ring provided with inwardly projecting extensions slotted at their ends to inclose said integral member between them, one of said extremities provided with a recess on its inner face, a lever pivoted adjacent to one of said slotted openings and extending over both of them, and a pawl pivoted in the outer end of said lever and adapted to pass through one of said openings and to engage the recess in its adjacent extremity.

In testimony whereof, I hereunto set my hand this 20" day of November, 1911.

WILLIAM N. BOOTH.

In presence of—
Wm. M. Monroe,
P. Bredel.